L. WEIMAR.
REVOLVING DRAG.
APPLICATION FILED SEPT. 26, 1911.
1,031,894.
Patented July 9, 1912.
2 SHEETS—SHEET 2.
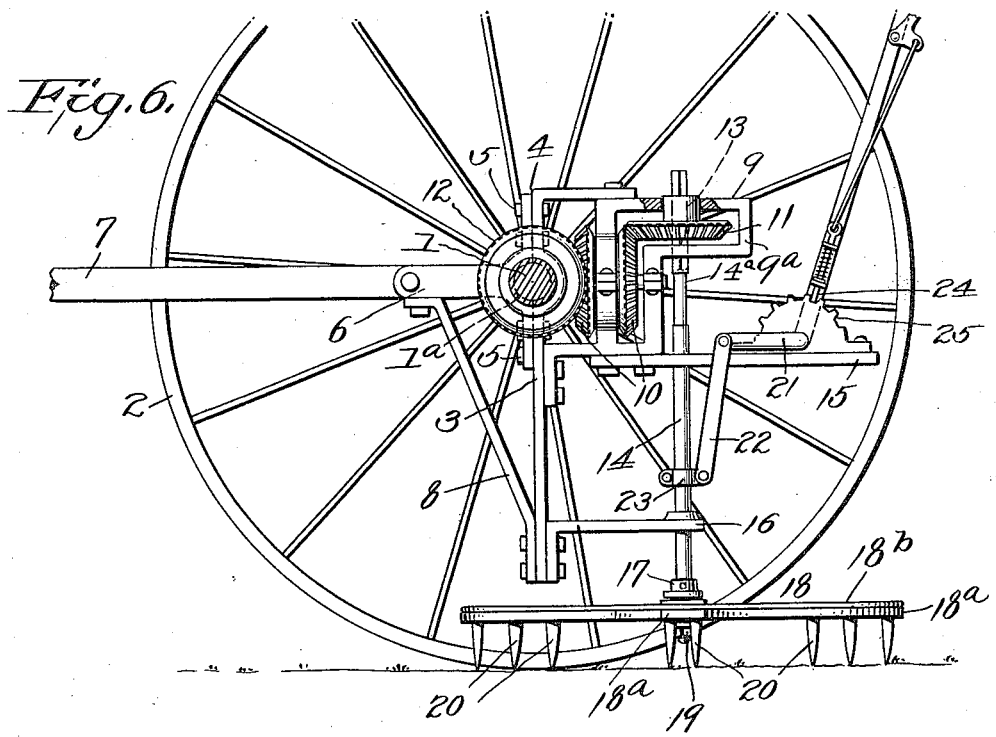
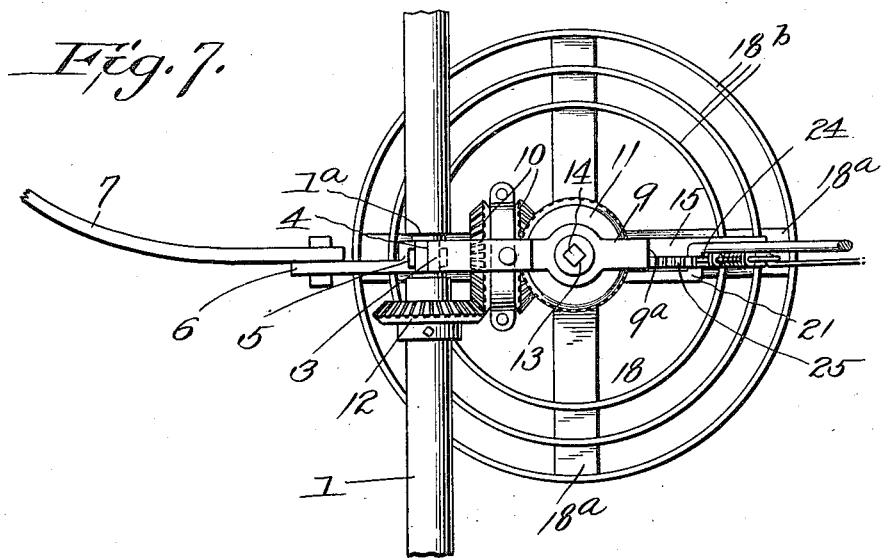
WITNESSES
Oliver W. Holmes
H. B. Cornwall.
INVENTOR
Louis Weimar
Attorney

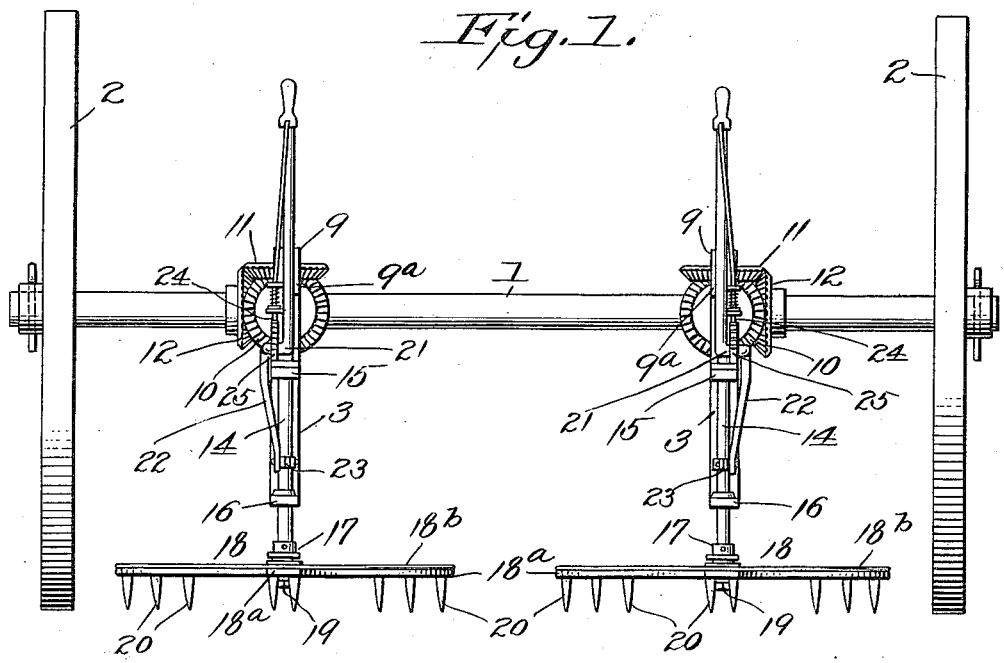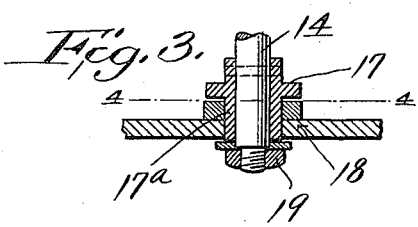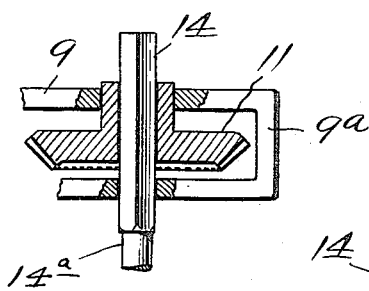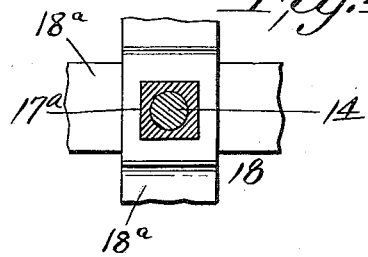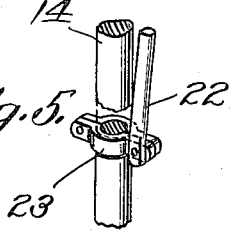

UNITED STATES PATENT OFFICE.

LOUIS WEIMAR, OF APPLETON, WISCONSIN.

REVOLVING DRAG.

1,031,894.	Specification of Letters Patent.	Patented July 9, 1912.

Application filed September 26, 1911. Serial No. 651,391.

*To all whom it may concern:*

Be it known that I, LOUIS WEIMAR, a citizen of the United States, residing at Appleton, in the county of Outagamie and State of Wisconsin, have invented certain new and useful Improvements in Revolving Drags, of which the following is a specification.

The present invention relates in general to agricultural implements, and more particularly to a revolving drag or harrow which embodies novel features of construction whereby the clods can be broken up and the soil effectively pulverized with a comparatively small amount of labor.

Among the objects of the invention are to provide a revolving drag which is comparatively simple and inexpensive in its construction, which can be quickly thrown into or out of operative position, which can be readily controlled by a single person, and which will require but a small amount of power.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a rear view of a revolving drag or harrow constructed in accordance with the invention. Fig. 2 is an enlarged vertical sectional view through the gear wheel at the upper end of the vertical shaft of the revolving drag. Fig. 3 is a detail sectional view showing the manner of fastening the drag frame to the shaft. Fig. 4 is a horizontal sectional view on the line 4—4 of Fig. 3. Fig. 5 is a detail perspective view of the collar which is applied to the drag shaft for moving the same vertically. Fig. 6 is a longitudinal vertical sectional view through the revolving drag, and Fig. 7 is a top plan view of one of the revolving drag members and the gearing for operating the same.

Corresponding and like parts are referred to in the following description and indicated in all the views of the drawings by the same reference characters.

Specifically describing the present embodiment of the invention, the numeral 1 designates the axle which is provided at the ends thereof with the usual wheels 2, the said wheels being rigid with the axle so that the latter will revolve as the machine is advanced across a field. Brackets 3 are pendent from the axle 1 at points toward the opposite ends thereof, the said brackets being provided at their upper ends with divided bearings 4 fitted upon reduced portions $1^a$ of the axle. With this construction it will be obvious that the axle turns freely within the bearings, the brackets being held against longitudinal movement upon the shaft by the shoulders at the ends of the reduced portions $1^a$. The two halves of the divided bearing 4 are connected by suitable fastening members such as the bolts 5, the rear half of each of the bearings being integral with the respective bracket 3, while the forward half is formed with an arm 6 to which the tongue 7 of the drag is applied. A diagonal brace 8 extends from the tongue 7 to the lower end of the bracket 3 so as to reinforce the bracket, and it will be obvious that the pull exerted upon the arm 6 by the tongue 7 when the machine is in operation will serve to hold the bracket against rotation and retain the same in a substantially vertical position.

A frame 9 projects rearwardly from the upper end of each of the brackets 3 and has a vertical gear wheel 10 and a horizontal gear wheel 11 journaled thereon, the said gear wheels meshing with each other and the vertical gear wheel 10 also meshing with a gear wheel 12 rigid with the axle 1. The horizontal gear wheel 11 is journaled in a looped portion $9^a$ of the frame 9 and is formed with an angular opening 13 loosely receiving the upper end of a shaft 14 to which the drag is attached.

The drag shaft 14 is journaled in an upper arm 15 and also in a lower arm 16 projecting rearwardly from the bracket 3, the lower end of the shaft having a cap 17 rigidly applied thereto. This cap is formed with an angular portion $17^a$ adapted to be inserted in a corresponding opening in the drag frame 18, the said frame being held in position by means of a nut 19. The frame 18 may be of any preferred construction, although it is shown as formed of a pair of intersecting cross bars $18^a$ having the arms thereof connected by a series of concentric circular braces $18^b$. The usual teeth 20 project from the frame 18, and with the foregoing construction it will be obvious that the frame 18 will be revolved in a horizontal plane as the machine is advanced across a field.

The upper arm 15 extends beyond the drag shaft 14 where it is provided with a bell crank lever 21, the short arm of the said lever being connected by a link 22 to a split collar 23 applied to a reduced portion of the shaft. As has been before mentioned, the upper end of the shaft 14 has an angular formation and slides freely through an angular opening in the gear wheel 11, so that by suitably manipulating the lever 21, the shaft 14 can be moved vertically and the drag raised and lowered as may be required. For the purpose of enabling the drag to be held in an adjusted position, the lever is provided with a latch 24 adapted to engage a segmental rack 25 upon the arm 15.

The two revolving drags upon opposite ends of the axle are identical in construction, and the two drags can be raised and lowered as may be required through the medium of the levers 21. When the machine is in operation the drags will revolve horizontally, thereby causing the teeth 20 to operate in a very effective manner to break up the clods and pulverize the soil.

The drag shaft 14 is provided immediately below the angular upper end thereof with a reduced portion 14ª which enters the gear wheel 11 when the drag is lifted into an elevated position. This reduced portion 14ª of the shaft does not engage the opening of the gear wheel 11 so that the drag does not revolve when it is elevated. However, as soon as the drag is again lowered into operative position the angular portion of the shaft again engages the angular opening of the gear wheel 11 so that the drag is revolved in the desired manner.

Having thus described the invention, what I claim as new and desire to secure by Letters Patent, is:—

1. In a revolving drag, the combination of a positively driven axle, a bracket formed with a bearing loosely receiving the axle, a tongue having an operative connection with the said bearing so as to hold the bracket against rotation upon the axle, a shaft carried by the bracket, a drag upon the shaft, and means for transmitting motion from the axle to the shaft.

2. In a revolving drag, the combination of a positively driven axle, a bracket formed with a bearing receiving the axle, an arm projecting from the bearing, a tongue connected to the arm so as to hold the bracket against rotation upon the axle, a revolubly mounted drag carried by the bracket, and means for transmitting motion from the axle to the drag.

3. In a revolving drag, the combination of a positively driven axle, a bracket pendent from the axle and provided at the upper end thereof with a bearing receiving the axle, an arm projecting from the bearing, a diagonal brace between the arm and the lower end of the bracket, a tongue connected to the arm so as to hold the bracket against rotation upon the axle, a revolubly mounted drag carried by the bracket, and means for transmitting power from the axle to the drag.

4. In a revolving drag, the combination of a positively driven axle, a bracket pendent from the axle and provided at the upper end thereof with a bearing receiving the axle, an arm projecting from the bearing, a tongue connected to the arm so as to hold the bracket against rotation upon the axle, arms projecting from the bracket, a shaft journaled in the arms, a drag upon the shaft, means for transmitting motion from the axle to the shaft, and means for sliding the shaft longitudinally to move the drag into and out of operative position.

5. In a revolving drag, the combination of a positively driven axle, a bracket formed with a bearing receiving the axle, an arm projecting from the bearing, a tongue connected to the arm so as to hold the bracket against rotation upon the shaft, a revoluble drag carried by the bracket, means for moving the drag into and out of operative position, and means for transmitting motion from the axle to the drag.

6. In a revolving drag, the combination of a positively driven axle, a bracket pendent from the axle and formed with a bearing loosely receiving the same, an arm projecting from the bearing, a tongue connected to the arm so as to hold the bracket against rotation upon the axle, a gear frame upon the bracket, gear wheels journaled upon the said frame, one of the said gear wheels being horizontally disposed and having an angular opening through the center thereof, a gear wheel upon the axle meshing with one of the said gear wheels, a vertical shaft carried by the bracket and having the upper end thereof formed with an angular section and passing slidably through the angular opening of the before mentioned gear wheel, a drag at the lower end of the shaft, and means for sliding the shaft longitudinally to move the drag into and out of operative position.

7. In a revolving drag, the combination of a positively driven axle, a bracket pendent from the axle and formed at the upper end thereof with a bearing loosely receiving the said axle, an arm projecting forward from the bearing, a tongue connected to the arm so as to hold the bracket against rotation upon the axle, a frame projecting rearwardly from the upper end of the bracket and formed with a horizontally disposed looped portion, a horizontal gear wheel journaled within the said looped portion of the frame and having an angular opening at the center thereof, a second gear wheel journaled upon the frame and meshing with the said horizontal gear wheel, a gear wheel applied to the axle and meshing with the second gear wheel, arms projecting from the bracket, a vertical shaft journaled in the arms, the upper end of the said vertical shaft having an angular cross section and being slidably received within the before mentioned angular opening of the horizontal gear wheel, a drag applied to the lower end of the shaft, a lever mounted upon one of the said arms, and an operative connection between the lever and the shaft for moving the latter longitudinally to throw the drag into and out of operative position.

In testimony whereof I affix my signature in presence of two witnesses.

LOUIS WEIMAR.

Witnesses:
 JOE DIENER,
 NINA MACFARLANE.

---

Copies of this patent may be obtained for five cents each, by addressing the "Commissioner of Patents, Washington, D. C."